United States Patent
Harms et al.

(10) Patent No.: US 7,533,646 B2
(45) Date of Patent: May 19, 2009

(54) BALANCING SHAFT FOR AN INTERNAL COMBUSTION ENGINE AND A METHOD FOR THE PRODUCTION THEREOF

(75) Inventors: Torsten Harms, Hamburg (DE); Frank Rohwer, Moisburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/556,121

(22) PCT Filed: Apr. 29, 2004

(86) PCT No.: PCT/EP2004/004541

§ 371 (c)(1),
(2), (4) Date: Mar. 9, 2007

(87) PCT Pub. No.: WO2004/099648

PCT Pub. Date: Nov. 18, 2004

(65) Prior Publication Data

US 2007/0251489 A1 Nov. 1, 2007

(51) Int. Cl.
*F02B 75/06* (2006.01)
*B21K 3/00* (2006.01)
(52) U.S. Cl. ................. 123/192.2; 29/888.01
(58) Field of Classification Search .............. 123/192.2, 123/197.4
See application file for complete search history.

(56) References Cited

U.S. PATENT DOCUMENTS

| | | | |
|---|---|---|---|
| 5,483,932 A * | 1/1996 | Friedman et al. | 123/192.2 |
| 5,791,309 A * | 8/1998 | Yamazaki et al. | 123/192.2 |
| 5,857,388 A * | 1/1999 | Killion et al. | 74/603 |
| 6,237,442 B1 * | 5/2001 | Killion | 74/603 |
| 6,626,063 B2 * | 9/2003 | Killion | 74/603 |
| 6,659,061 B2 * | 12/2003 | Nomura | 123/192.2 |
| 6,682,437 B2 * | 1/2004 | Killion et al. | 464/185 |

FOREIGN PATENT DOCUMENTS

| | | |
|---|---|---|
| DE | 975 104 C | 8/1961 |
| DE | 197 23 378 A1 | 1/1998 |
| DE | 198 32 987 A1 | 2/1999 |
| DE | 198 37 091 A1 | 2/2000 |
| EP | 000385160 A1 * | 9/1990 |
| FR | 819 193 A | 10/1937 |
| FR | 2 129 411 A | 10/1972 |
| GB | 1 367 831 A | 9/1974 |
| GB | 2 050 207 A | 1/1981 |
| WO | WO 01/29447 A1 | 4/2001 |

* cited by examiner

*Primary Examiner*—Noah Kamen
(74) *Attorney, Agent, or Firm*—Patent Central LLC; Stephan A. Pendorf

(57) ABSTRACT

The invention relates to a balancing shaft for an internal combustion engine and to a method for the production thereof. In this case, the balancing shaft consists of a tubular hollow body and contains a balancing weight and also functional elements arranged on the hollow body. In order to design a balancing shaft in as simple a manner as possible, which balancing shaft is designed to save construction space and in which the adequate balancing weight is arranged at the suitable location in accordance with the requirements, it is proposed that the balancing weight be arranged on the outer circumference of the hollow body and that it be fastened there.

11 Claims, 1 Drawing Sheet

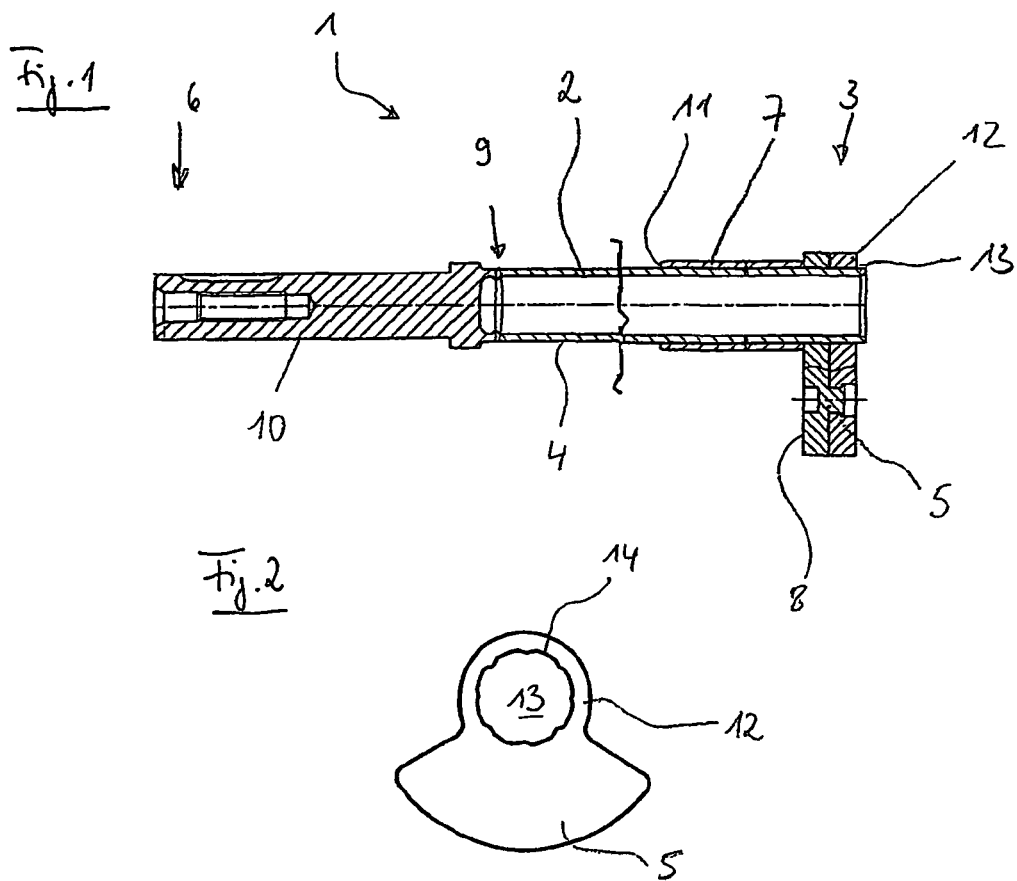
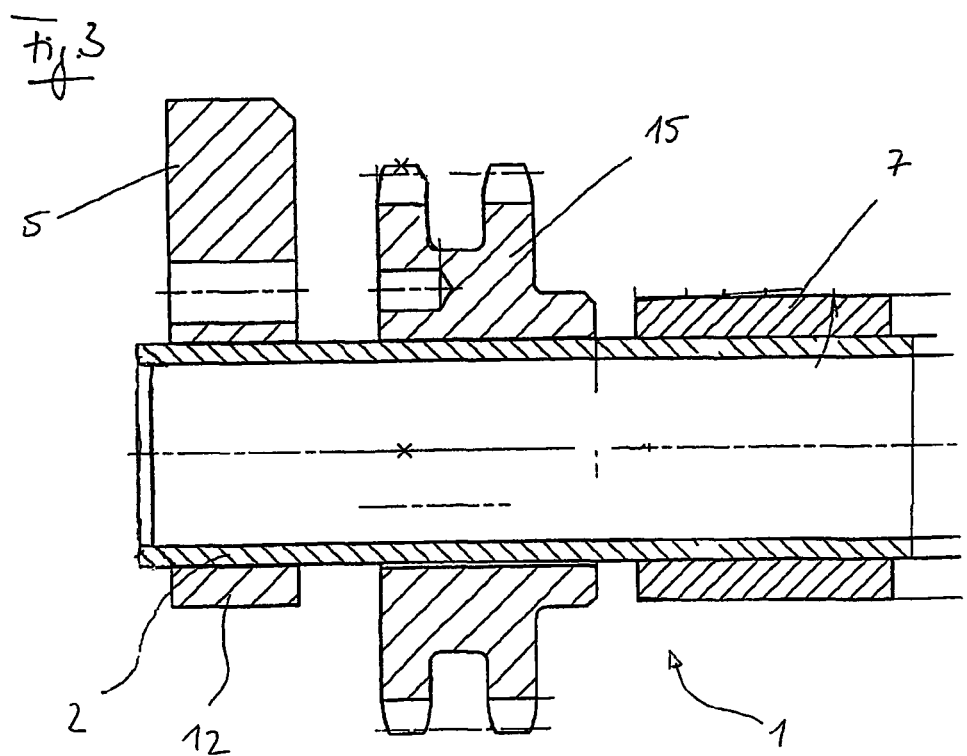

BALANCING SHAFT FOR AN INTERNAL COMBUSTION ENGINE AND A METHOD FOR THE PRODUCTION THEREOF

CROSS REFERENCE TO RELATED APPLICATION

This application is a national stage of PCT/EP2004/004541 filed Apr. 29, 2004 and based upon DE 103 20 747.3 filed May 9, 2003 under the International Convention.

BACKGROUND OF THE INVENTION

1. Field of the Invention

The invention relates to a balancing shaft for an internal combustion engine and to a method for the production thereof.

2. Related Art of the Invention

A balancing shaft of the generic type or a method of the generic type for the production thereof has been disclosed by DE 198 32 987 A1. The balancing shaft described there is of tubular design and has in its interior a balancing weight which extends virtually over its entire length. The tubular part in this case is provided at the circumference with two recesses which each have a centrally situated hole. Passing through each hole is a pin, which in like manner projects through the balancing shaft. The pin serves in this case to fasten the balancing weight to the tubular part. The tubular part is closed at both ends by a cap by pressing the latter into position or by brazing. In the case of the balancing shaft described, the fastening is very laborious, since either the pin has to be locked from the interior of the balancing shaft or, if the pin is already arranged in the balancing shaft, the balancing weight has to be laboriously pushed back and forth until the pin is threaded through the hole in the wall of the tubular part and can then be locked from outside. Furthermore, the practical requirements imposed on a balancing shaft are rarely such as can be gathered from the known publication. This is because the local arrangement of the balancing weight is usually desired. In order to be able to fulfill its function, the balancing weight in this case must have a certain size. However, the larger said balancing weight has to be, the greater the volume required by the balancing weight. In order to achieve this in the known balancing shaft, the diameter of the tubular part must increase in accordance with the increase in the space taken up locally by the balancing weight. The result of this is that such a balancing shaft takes up an enormous construction space such as is not available as a rule nowadays in modern engines.

SUMMARY OF THE INVENTION

The object of the invention is to develop a balancing shaft of the generic type to the effect that a construction-space-saving design of the shaft is made possible, the shaft having an adequate balancing weight at the desired location of the balancing shaft in accordance with the requirements. In conformity with this, it is also the object of the invention to specify a method with which the balancing weight can be produced in the simplest possible manner.

On account of the fact that the balancing weight is arranged on and fastened to the outer circumference of the hollow body, the hollow body, which forms the base part of the balancing shaft, can be designed to be relatively small in its diameter, and the wall thickness can be designed to be very small (about 2 mm), which results in a considerable reduction in the weight of the entire shaft. Furthermore, due to the balancing weight being placed locally on the outer circumference, the length of the hollow body is not increased, so that the overall construction space required for the hollow body is especially small, and only sufficient construction space has to be provided in the engine instead of the placing of the balancing weight. In addition, the balancing weight is readily accessible and can be placed at the correct location of the hollow body in a simple manner, the axial position also being freely selectable for the functional elements, and can also be easily fastened to the hollow body with all suitable means.

In a preferred development of the invention, the balancing weight is integrally formed on a hub which locally encloses the hollow body and is fastened to the latter. The hub takes up only a small construction space, whereas, for the balancing weight, it offers a larger connecting area for the fastening to the hollow body due to the enclosure of the hollow body, so that an improved hold of the balancing weight on the hollow body is achieved overall.

In a further preferred embodiment of the balancing shaft according to the invention or of the corresponding method according to the invention, the balancing weight is connected to the hollow body in an interference fit. Due to the interference fit, reliable fastening of the balancing weight is achieved with relatively simple means, without additional fastening elements. For achieving such an interference fit, for example thermal shrink fitting or magnetic forming and or press-fitting of the balancing weight with a hub inside diameter having an undersize relative to the outside diameter of the hollow body are conceivable.

In a further preferred embodiment of the invention, the functional elements with regard to the balancing shaft and with regard to the corresponding method are arranged as individual components on the hollow body and are connected to the latter in an interference fit. Here, the same advantages may be cited as in the embodiment.

In an especially preferred embodiment of the balancing shaft according to the invention, the balancing weight and/or the functional elements are additionally connected to the hollow body in a positive-locking manner. This leads to a further improved hold of the balancing weight and of the functional elements on the hollow body relative to mechanical loads in the axial or radial direction.

In a further, especially preferred embodiment of the balancing shaft according to the invention, the hollow body is plastically expanded at the location of its connection to the balancing weight, the balancing weight being expanded at this location in such a way as to spring back elastically. This results in an especially strong interference fit between hollow body and balancing weight for an immovable hold of the balancing weight during axial mechanical stresses and also during very high radial mechanical stresses, in particular at a high speed of the balancing shaft and with high centrifugal masses of the balancing weight during operation of the balancing shaft.

Further, the invention shows a preferred embodiment of the balancing shaft. Here, the hollow body is connected at one end in one piece with a connecting component for drive components such as chain wheels or centrifuges, the connecting part closing the hollow body. The one-piece connection results in high strength for the entire component of the balancing shaft at the connecting location. At the same time, the balancing shaft is closed at one end by this connection, after which said balancing shaft only needs to be closed at the opposite end. This is effected, for example, by a cap, the overall effect being to prevent moisture from entering the interior of the hollow body. The one-piece connection and the solidness of the connecting component the balancing shaft is highly robust relative to the engagement of the drive components.

In a preferred embodiment of the method according to the invention, by means of a hub on which the balancing weight is integrally formed, said balancing weight is pushed onto the hollow body and is then fastened to the latter. Simple positioning of the balancing weight on the hollow body is achieved by said balancing weight being pushed on, the subsequent fixing on the hollow body requiring little outlay in terms of equipment for the retention or clamping in place.

Further, especially preferred embodiment of the method according to the invention. The use of a fluidic internal high pressure for achieving an interference fit further facilitates the positioning of the balancing weight and/or of the functional elements, since the balancing weight and/or the functional elements, with oversize of the hub inside diameter or of the bore diameter, respectively, can be pushed on with particular ease. In addition, the desired interference fit can be set exactly by means of the fluid pressure control of the internal high pressure, since, when producing said interference fit, the wall thicknesses and the material properties of the joining members can be advantageously taken into account with regard to their fracture resistance by a suitable pressure control, so that, during the production of the balancing shaft, the process reliability is absolutely ensured. Furthermore, the joining operation can be effected quickly and with relatively little outlay in terms of equipment.

In a further, especially preferred embodiment of the method according to the invention, the wall of the through-opening of the hub and/or the wall of the bore with which the balancing weight and/or the functional elements are pushed onto the hollow body are/is designed to be rotationally asymmetric, in which case, by means of fluidic internal high pressure, the hollow body is connected to the balancing weight and/or the functional elements in a positive-locking manner by at least partial contact with rotationally asymmetric surfaces of the wall of the through-opening of the hub and/or of the wall of the bore. By the design of the inside of the hub or of the bore in a rotationally asymmetric form, for example in an oval design or formed by hollows or longitudinal grooves during the production or by subsequent machining, positive locking is achieved in a simple manner in interplay with the internal high pressure, which allows the material of the hollow body to flow and forces said material against the rotationally asymmetric surface of the bore wall or of the wall of the hub through-opening, where it remains irreversible. This positive locking increases even further the strong hold of the joining members on one another which is achieved anyway by the friction grip of the interference fit of hollow body and balancing weight and/or functional elements.

In a further configuration of the method according to the invention, at least one of the open ends of the hollow body is friction welded to a connecting component closing the end and intended for drive components such as chain wheels or centrifuges. Through the use of friction welding, with a short cycle time and relatively little outlay, an extremely durable connection between the hollow body and the connecting component is created.

BRIEF DESCRIPTION OF THE DRAWINGS

The invention is explained below in more detail with reference to several exemplary embodiments shown in the drawings, in which:

FIG. 1 shows a longitudinal section of a balancing shaft according to the invention with a connecting component, FIG. 2 shows a front view of a balancing weight for a balancing shaft according to the invention according to FIG. 1, FIG. 3 shows a truncated longitudinal section of a balancing shaft according to the invention with functional elements mounted on it.

DETAILED DESCRIPTION OF THE INVENTION

A balancing shaft 1 for an internal combustion engine is shown in FIG. 1, the shaft 1 consisting of a tubular hollow body 2, which in turn consists of a tubular section of a drawn tube. However, the hollow body 2 may also be produced from a rolled plate which is longitudinally seam-welded at its joint. At one end 3 of the balancing shaft 1, a balancing weight 5 is arranged on the outer circumference 4 of the hollow body 2 and is fastened there. Towards the other end 6 of the balancing shaft 1, the hollow body 2 carries a functional element in the form of a bearing sleeve 7, which is supported at one end on an end face 8 of the balancing weight 5. That end 9 of the hollow body 2 which is remote from the balancing weight is connected in one piece to a connecting component 10.

The connecting component 10, which is of solid design, forms a continuation of the axial extent of the hollow body 2. The connecting component 10, which may be a turned part, a hot-pressed part, a sintered part or a cold-extruded part, serves to connect the drive components, such as chain wheels or centrifuges.

To produce the balancing shaft 1, first the bearing sleeve 7 and then the balancing weight 5 are pushed into the desired position. Whereas this is effected via the bore 11 of the bearing sleeve 7, the balancing weight 5 is integrally formed on a hub 12, as also illustrated in FIG. 2, so that the balancing weight 5 is pushed with the through-opening 13 of the hub 12 onto the hollow body 2. The bearing sleeve 7 and the balancing weight 5 are then connected to the hollow body 2, with an interference fit being formed. In this case, the bearing sleeve 7 and the balancing weight 5 can be connected to the hollow body 2 separately from one another or together with one another at the same time. The interference fit may be produced, for example, by broaching the hollow body 2. Here, however, the joining operation is to be advantageously executed by means of fluidic internal high pressure which is generated in the interior of the hollow body 2. A plurality of techniques are conceivable with regard to the internal high pressure joining. For example, the hollow body 2 with the pushed-on bearing sleeve 7 and the pushed-on balancing weight 5 can be inserted into an internal high pressure forming die, the die having the negative contour of the balancing shaft 1 outside the joints to be produced. At the location of the pushed-on joining members, i.e. the bearing sleeve 7 and the balancing weight 5, the die is designed in such a way that the joining members are mounted there with predetermined clearance. Finally, a fluidic internal high pressure is generated in the entire hollow body 2, and this fluidic internal high pressure plastically expands the hollow body 2 only at the joints, whereas no uncontrolled deformation of the hollow body 2 occurs outside the joints due to the contact of hollow body 2 with the impression of the forming die. Due to the plastic expanding of the hollow body 2, the outer circumference 4 of the hollow body 2 abuts against the wall of the through-opening 13 of the hub and also at the same time against the bore wall of the bearing sleeve 7. The hollow body 2 is now briefly expanded further, as a result of which the bearing sleeve 7 and the balancing weight 5 or the hub 12 are plastically expanded via the respective contact with said hollow body 2. After the pressure fluid inside the hollow body 2 is relieved, the material of the bearing sleeve 7 and of the hub 12 or of the balancing weight 5 springs back, whereas the hollow body 2 remains in its expanded plastic form. An extremely strong interference fit is produced in the process. A further conceivable possibility for the use of the internal high pressure technique consists in moving two movable plungers into the left-hand end and the right-hand end, respectively, of the hollow body 2 until they are at an established axial distance from one another. This distance defines an intermediate space which comes to lie in the joining position of the joining members. Pressure fluid is then introduced via one of the plungers or both plungers into the intermediate space and a high pressure is generated. By means of this high pressure, the hollow body 2 is plastically expanded only at the location of the joining members. A further, especially preferred variant of the internal high pressure technique consist in pushing an expansion lance into the hollow body 2, in which case an axial pressure-fluid passage runs inside the expansion lance, and short radial passages branch off from the expansion lance (or the branching of only a single passage is also possible) and open out at the outer lateral surface of the expansion lance. The orifice openings are in this case laterally defined axially by annular seals and enclose an expansion space in the process. When the expansion lance is pushed into the hollow body 2, the annular seals nestle against the inside of the hollow body 2. After a desired push-in position has been reached, the respective expansion space is located below the joint of the respective joining member. The expanding of the hollow body 2 can then be effected by introducing a pressure fluid via the desired passages. The joining members can be joined to the hollow body 2 simultaneously in the arrangement of a plurality of expansion spaces or sequentially in the arrangement of only one expansion space. The last-mentioned variant of the internal high pressure technique requires little outlay in terms of apparatus and makes possible especially quick production of the balancing shaft 1. The hollow body 2 joined to the bearing sleeve 7 and the balancing weight 5 is then friction-welded at its end 9 to the connecting component 10, thereby producing a one-piece connection between the latter and the hollow body. The connecting component 10 closes the hollow body 2 in the process. Alternatively, however, it is also conceivable to already connect the hollow body 2 to the connecting component 10 without the joining members in a first working step, after which the joining to the joining members can proceed according to the first and the third variant of the internal high pressure technique.

An additional increase in the hold of the joining members, in particular of the balancing weight 5, on the hollow body 2 and thus in the operating reliability of the balancing shaft 1 can be achieved by forming a positive-locking connection. To this end, axially running grooves 14 are formed on the wall of the otherwise circular-cylindrical through-opening 13 of the hub 12, these grooves 14 constituting rotationally asymmetric surfaces of the through-opening 13. Once the balancing weight 5 with the hub 12 locally enclosing the hollow body 2 has been pushed on and correspondingly positioned on the hollow body 2, a fluidic internal high pressure is produced as before and plastically expands the hollow body 2. In the process, the material of the hollow body is displaced into the grooves 14, where it finds at least partial contact and digs into the grooves 14. The desired positive-locking connection is thus achieved. A positive-locking connection of such a design is also conceivable in each of the pushed-on functional elements. Due to the increase in the hold of the balancing weight 5 and of the functional elements on the hollow body 2 via the positive-locking connection, other more labor-intensive hold-increasing processing methods, such as rough blasting of the wall of the through-opening 13 of the hub 12 or of the wall of the bore 11 of the functional elements, can be dispensed with.

In conclusion, reference may also be made to FIG. 3, in which a tubular body 2 is shown onto which a balancing weight 5 with its hub 12, a bearing sleeve 7 and a chain wheel 15 are pushed with clearance and are finally joined by internal high pressure. Sensor rings may likewise be joined on the hollow body 2.

The invention claimed is:

1. A method of producing a balancing shaft having a balancing weight fastened to a hollow tubular body of the balancing shaft, the balancing weight being positioned on and fastened to an outer circumference of the hollow tubular body with formation of an interference fit, comprising:
   introducing the balancing weight (5) onto the hollow body (2),
   plastically expanding the hollow body (2) by means of an internal high pressure inside the hollow body (2) locally only at a location of the introduced balancing weight (5),
   expanding the balancing weight (5) due to a contact of the balancing weight (5) with the hollow body (2), and
   relieving the internal high pressure so that the balancing weight (5) springs back elastically.

2. The method as claimed in claim 1, wherein, by means of a hub (12) on which the balancing weight (5) is integrally formed, said balancing weight (5) is pushed onto the hollow body (2) and is then fastened.

3. The method as claimed in claim 2, further comprising pushing functional elements, with a bore (11), as individual components onto the hollow body (2) and connecting to the latter, with an interference fit being formed.

4. The method as claimed in claim 3, wherein a wall of a through-opening (13) of the hub (12) and/or a wall of a bore (11) with which the balancing weight (5) and/or the functional elements are pushed onto the hollow body (2) are/is designed to be rotationally asymmetric, and in that, by means of fluidic internal high pressure, the hollow body (2) is connected to the balancing weight (5) and/or the functional elements in a positive-locking manner by at least partial contact with rotationally asymmetric surfaces of the wall of the through-opening (13) of the hub (12) and/or of the wall of the bore (11).

5. The method as claimed in claim 1, wherein at least one of open ends (9) of the hollow body (2) is friction welded to a connecting component (10) closing the end and intended for drive components.

6. The method as claimed in claim 5, wherein said drive components are selected from chain wheels and centrifuges.

7. The method as claimed in claim 1, wherein the internal high pressure is applied by broaching.

8. The method as claimed in claim 1, wherein the internal high pressure is applied by fluidic internal high pressure.

9. The method as claimed in claim 1, wherein the partial expansion of the hollow body (2) by the internal high pressure locally only at the location of the balancing weight is achieved by an internal high pressure forming die that has a negative contour of the balancing shaft outside the location of the balancing weight.

10. The method as claimed in claim 1, wherein the partial expansion of the hollow body (2) by the internal high pressure locally only at the location of the balancing weight is achieved by movable plungers to be inserted into the hollow body.

11. The method as claimed in claim 1, wherein the partial expansion of the hollow body (2) by the internal high pressure locally only at the location of the balancing weight is achieved by an expansion lance to be inserted into the hollow body.

* * * * *